United States Patent Office 3,419,730
Patented Dec. 31, 1968

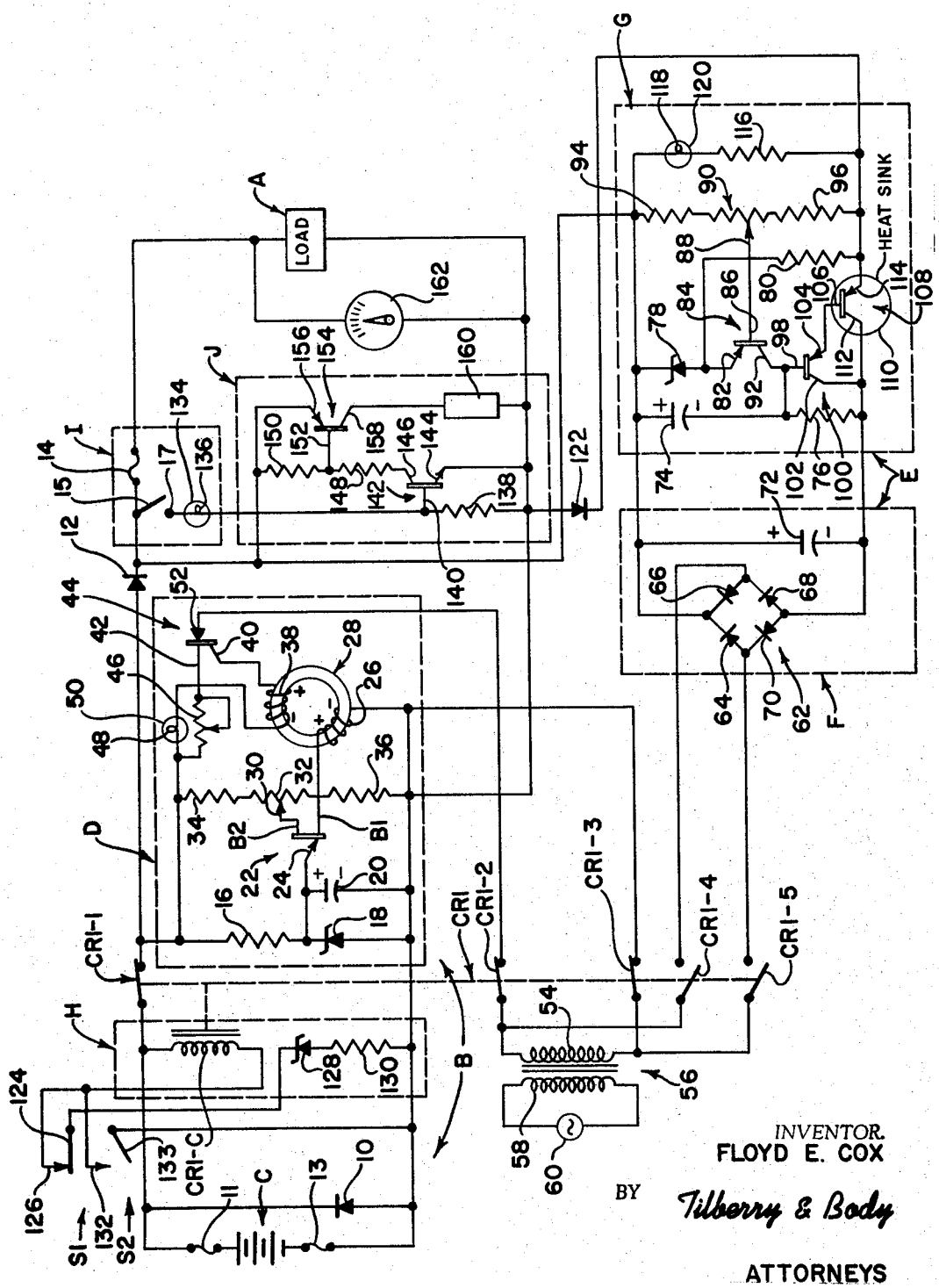

3,419,730
POWER SUPPLY
Floyd E. Cox, Franklin, Mass., assignor to E. W. Bliss
Company, Canton, Ohio, a corporation of Delaware
Filed June 7, 1965, Ser. No. 461,942
6 Claims. (Cl. 307—66)

ABSTRACT OF THE DISCLOSURE

A direct current power supply having a primary source battery for supplying direct current to a load and a regulated secondary source alternating current voltage to direct current voltage inverter for automatically supplying the load when the battery voltage falls below a predetermined value. The primary source battery is connected in parallel circuit with an automatic battery charger, for maintaining the battery, both of which are normally connected across the terminals of the load. When the terminal voltage of the battery falls below a predetermined value, a normally energized relay connected across the battery terminals is de-energized and the battery and battery charger are disconnected from the load, and the regulated secondary source is connected across the terminals of the load. A fuse in series with the load is provided to limit the load current to a predetermined maximum value, and a switch responsive to a failure of the fuse automatically energizes an alarm indicator to warn that the maximum value of the load current has been exceeded.

---

This invention is directed toward a power supply for a direct current load and, more particularly, to an improved power supply having a primary and a secondary power supply source.

The invention is particularly applicable for use in conjunction with annunciator systems and will be described with reference thereto; although it will be appreciated that the invention has broader applications and may be used, for example, wherever a reliable power supply is required.

Recently, a fire alarm annunciator system has been developed for industrial and other uses, and takes the form as disclosed in United States patent application, Ser. No. 460,264 filed June 1, 1965, entitled, "Annunciator System," assigned to the same assignee as the present invention. That system includes a monitoring circuit having an end of line resistor and a switch for short circuiting the resistor, and a supervisory circuit interconnected with the end of line resistor. Supervisory current of 1 milliampere direct current normally flows through a direct current load including the monitoring circuit and a portion of the supervisory circuit. The supervisory circuit includes a first circuit for energizing an alarm lamp when the supervisory current increases in value to at least 3 milliamperes, as upon short circuiting the end of line resistor by the switch, indicative of an alarm condition; and, a second circuit for energizing a trouble lamp when the supervisory current decreases below 1 milliampere, or is extinguished, as upon an open circuit in the current path, or upon failure of the power source supplying the supervisory current. Thus, a reliable power supply is required to continuously supply the required direct current voltage to the annunciator system so that the supervisory direct current will normally be not less than 1 milliampere nor equal to or greater than 3 milliamperes. Since the supervisory current will flow continuously during the operating lifetime of the system, the power supply should be capable of being independent of line supply voltage from a local power utility and thus should include a battery and an automatic battery charger. For maximum reliability, the power supply should include provisions for obtaining the required direct current voltage from line supply voltage when the battery output voltage is less than the required voltage, or if the battery fails, or if the battery is being replaced. These provisions should include a control circuit for automatically switching from battery voltage to line voltage, when required, an A.C. to D.C. inverter and a voltage regulator circuit to regulate the inverter output voltage in accordance with variations in the direct current load to assure that the power supply output voltage is equal to the required voltage.

Power supplies which include a battery and a battery charger circuit are well known; however, such supplies are normally maintained connected to a load even when the battery output voltage decreases in value. If such a supply is used with an annunciator system as previously described, the supervisory current might decrease to a value less than 1 milliampere, whereby the trouble lamp would become energized, presenting a faulty trouble indication due to the use of an inferior power supply.

The present invention is directed toward a power supply which continuously supplies the required direct current voltage to maintain direct current flow to a load within a given range to thereby satisfy the foregoing needs, and others, as well as overcoming the noted disadvantages, and others, of previous power supplies.

In accordance with the present invention, the power supply includes a primary supply source normally connected to a direct current load and has a battery and a battery charger; a secondary supply normally disconnected from the load and has an alternating current voltage to direct current voltage inverter circuit and a voltage regulator for the inverter circuit; and, a control circuit including means responsive to a decrease in battery output voltage below a predetermined value to disconnect the primary supply source from the load and connect the secondary supply source to the load.

In accordance with another aspect of the present invention, the control circuit includes a relay having a normally energized relay coil connected in series with a Zener diode across the battery and relay contacts including normally closed contacts connecting the battery to the load and normally open contacts maintaining the secondary source disconnected from the load.

In accordance with a still further aspect of the present invention, a fuse is connected between the power supply and the load to assure that the current supplied to the load will not exceed a predetermined value and indicating means becomes energized when the fuse is blown.

The primary object of the present invention is to provide a reliable power supply which continuously supplies the required direct current voltage to a load to maintain current flow through the load within a given range.

Another object of the present invention is to provide a power supply having both primary and secondary power sources.

A still further object of the present invention is to provide a power supply including a battery which will automatically become disconnected from its load when the value of the battery output voltage decreases below a predetermined value.

The invention may take physical form in certain parts and arrangement of parts, a preferred embodiment of which will be described in detail in the specification and illustrated in the accompanying drawing which is a part hereof and wherein:

The single drawing is a schematic circuit diagram of the preferred embodiment of the invention.

Referring now to the single drawing, wherein the showings are for the purpose of illustrating the preferred embodiment of the invention only and not for the purpose of limiting same, there is illustrated a power supply for a direct current load A and generally includes a primary source B having a battery C and an automatic battery charger D; a secondary source E having an A.C. to D.C. inverter F and a voltage regulator G; a source control circuit H; a fuse I; and, a fuse failure alarm circuit J.

PRIMARY SOURCE

The battery C of primary source B preferably takes the form of a 10 cell, 21.5 volt battery. A diode 10 has its anode to cathode circuit connected from the negative to positive side of battery C through fuse filaments 11 and 13, and the battery is connected across load A through normally closed relay contacts CR1–1 of a relay CR1, the anode to cathode circuit of a diode 12, and filament 14 of fuse I.

The automatic battery charger D includes a resistor 16 and a Zener diode 18 connected together in series across battery C through relay contacts CR1–1. A timing capacitor 20 of a unijunction transistor oscillator circuit is connected from the negative side of battery C to the junction of resistor 16 and Zener diode 18. The oscillator circuit also includes a unijunction transistor 22 having an emitter 24 connected to the junction of resistor 16 and capacitor 20, a first base B1 connected to the negative side of battery C through a primary winding 26 of a pulse transformer 28, and a second base B2 connected to a wiper arm 30 of a potentiometer 32. The potentiometer 32 is connected in series with resistors 34 and 36 across the battery C through relay contacts CR1–1. The pulse transformer 28 also has a secondary winding 38 having one end connected to a gate 40 and the other end connected to a cathode 42 of silicon controlled rectifier 44. A variable resistor 46 is connected in parallel with a filament coil 48 of a lamp 50 between cathode 42 of rectifier 44 and the junction of resistors 16 and 34. The rectifier 44 also has an anode 52 which is connected through normally closed relay contacts CR1–2 of relay CR1 to one end of a secondary winding 54 of a transformer 56 having a primary winding 58 connected across an alternating current voltage source 60, which may take the form of line voltage from a local power utility. The other end of secondary coil 54 is connected to the negative side of battery C through normally closed relay contacts CR1–3 of relay CR1.

SECONDARY SOURCE

The alternating current to direct current voltage inverter F of secondary source E includes a full wave rectifier 62 having four diodes 64, 66, 68 and 70 connected as shown. The rectifier 62 has an input circuit taken between the junction of diodes 64 and 70 and the junction of diodes 66 and 68 and is connected across the secondary winding 54 of transformer 56 through normally open relay contacts CR1–4 and CR1–5 of the relay CR1. The output circuit of rectifier 62 is taken between the junction of diodes 64 and 66 and the junction of diodes 68 and 70, and is connected across a smoothing capacitor 72.

The voltage regulator G of secondary source E includes a capacitor 74 connected in series with a resistor 76 across capacitor 72 of the inverter F. A Zener diode 78 is connected in series with a resistor 80 across the series connected capacitor 74 and resistor 76. The junction between the anode side of Zener diode 78 and the resistor 80 is connected to an emitter 82 of a PNP transistor 84, having a base 86 connected to a wiper arm 88 of a potentiometer 90, and a collector 92 connected to the junction of capacitor 74 and resistor 76. The potentiometer 90 is connected across capacitor 72 of inverter F through resistors 94 and 96. The collector 92 of transistor 84 is connected to the base 98 of a PNP transistor 100, having a collector 102 connected to capacitor 72 and an emitter 104 connected to the base 106 of a NPN transistor 108 mounted on a heat sink 110. Transistor 108 has a collector 112 connected to one side of capacitor 72 and an emitter 114 connected to the other side of capacitor 72 through a resistor 116 in series with a filament 118 of a lamp 120. The output circuit of the secondary source E is taken from the junction of resistor 94 and filament 118 of lamp 120, and the emitter 114 of transistor 108 is connected across load A through filament 14 of fuse I and the anode to cathode circuit of a diode 122.

SOURCE CONTROL CIRCUIT

The source control circuit H which serves to connect either the primary source B or the secondary source E across load A includes relay coil CR1–C of relay CR1 connected across battery C through movable contact 124 and a stationary contact 126 of a manually operable, normally closed switch S1, a Zener diode 128, poled as shown, and a resistor 130. Coil CR1–C is also connected to the negative side of battery C through a normally open reset switch S2 having a stationary contact 132 and a movable contact 133.

POWER SUPPLY FUSE FAILURE ALARM CIRCUITS

Power supply fuse circuit I includes fuse filament 14, an integral pin 15 and filament 136 of lamp 134. The pin 15 is operative when fuse filament 14 blows to electrically engage contact 17 connected to filament 136.

The power supply fuse failure alarm circuit J includes a resistor 138 connected in series with filament 136 of lamp 134 across the output circuits of both the primary source B and the secondary source E, i.e., from the cathode side of diode 12 to the anode side of diode 122. The junction of filament 136 and resistor 138 is connected to the base 140 of a NPN transistor 142, having an emitter 144 connected to the anode of diode 122 and a collector 146 connected to the cathode of diode 12 through series connected resistors 148 and 150. The junction of resistors 148 and 150 is connected to the base 152 of a PNP transistor 154 having an emitter 156 connected to the junction of the cathode of diode 12 and filament 14 of fuse I, and a collector 158 connected to the anode of diode 122 through a buzzer 160.

A volt meter 162 is connected across load A so that the voltage developed across the load may be visually monitored.

OPERATION

During the operation of the power supply, switch S1 is normally in the position as shown, i.e., with movable contact 124 in electrical engagement with stationary contact 126, whereby the battery output voltage, which is preferably on the order of 21.5 volts, is applied across the series connected circuit including the direct current relay coil CR1–C, the Zener diode 128 and resistor 130. So long as the battery output voltage exceeds 16 volts, with switch S1 in its normal position, the relay coil CR1–C will remain energized and its contacts CR1–1, CR1–2 and CR1–3 will be closed, as shown, and its contacts CR1–4 and CR1–5 will be open, as shown. Thus, current normally flows through load A from the positive side of battery C of primary source B through contacts CR1–1, the anode to cathode circuit of diode 12, the filament 14 of fuse I, the load A, and back to the negative side of battery C. So long as relay coil CR1–C is maintained energized its associated contacts CR1–4 and CR1–5 will be open, as shown, whereby the secondary source E will be de-energized.

So long as relay coil CR1–C is maintained energized, its associated contacts CR1–1 will maintain the automatic battery charger circuit D connected across battery C. The wiper arm 30 of potentiometer 32 in the battery charger D is adjusted so that unijunction transistor 22 is maintained reversed biased and nonconductive so long as the battery voltage is on the order of 21.5 volts. However, if the battery voltage decreases to a value less than 21.5 volts, the reverse bias voltage applied to base B2 of transistor 22 will decrease sufficiently in value with respect to the constant reference voltage developed across Zener diode 18 and, hence, across timing capacitor 20, so that the transistor 22 will become forward biased. Thus, the dynamic resistance between emitter 24 and base B1 will drop to an exceedingly small value and capacitor 20 will discharge through a circuit including the emitter 24 to base B1 of transistor 22, and the primary winding 26 of the pulse transformer 28. The capacitor 20 will then recharge, in accordance with the polarity shown, to the value of the reference voltage across Zener diode 18 and again discharge through the emitter to base B1 of transistor 22 and primary winding 26. Each time capacitor 20 discharges a voltage will be developed across secondary winding 38 of pulse transformer 28, in accordance with the polarity shown, whereby the silicon controlled rectifier 44 will become forward biased and conductive. During each positive half-cycle of the alternating current voltage of voltage source 60 the rectifier 44 will be forward biased and current will flow through the anode to cathode circuit of rectifier 44 to energize lamp 50 and charge the battery C.

When the battery C has recharged to 21.5 volts, the reverse bias potential on base B2 of transistor 22 will have sufficiently increased in magnitude with respect to that on emitter 24 that the transistor 22 will become reversed biased and nonconductive. Thus, the battery charger B will cease to charge battery C and lamp 50 will become de-energized.

Relay coil CR1–C will become de-energized when the battery output voltage decreases in value below 16 volts with switch S1 in its normal position, as shown. When relay coil CR1–C becomes de-energized, its associated contacts CR1–1, CR1–2 and CR1–3 will become open and contacts CR1–4 and CR1–5 will become closed, whereby the primary source B will be disconnected from load A and the secondary source E will be connected to load A. The alternating current voltage taken from the secondary winding 54 on transformer 56 will be full wave rectified by rectifier 62, and the rectified voltage is filtered by capacitor 72 to provide a direct current voltage in accordance with the polarities shown across capacitor 72, which voltage will be applied to load A through fuse I, diode 122 and the emitter to collector circuit of normally conductive transistor 108.

The output voltage developed by inverter F, as filtered by capacitor 72 and capacitor 74, will be applied across the series circuit including Zener diode 78 and resistor 80, as well as the series circuit including potentiometer 90 and resistors 94 and 96. The voltage developed across Zener diode 78 will be constant and is used as a reference voltage. The bias voltage applied to base 86 of transistor 84 will vary causing the transistor to become more or less conductive as the output voltage of inverter F tends to increase or decrease. This voltage variation is compared with the constant reference voltage developed across Zener diode 78 so that, for example, as the voltage decreases in magnitude the bias voltage applied to base 86 of transistor 84 will become more negative with respect to that on emitter 82, whereby transistor 84 will conduct more heavily applying more negative bias voltage to transistors 100 and 108. Thus, the emitter to collector resistance of transistor 108 will become reduced in proportion to the load A, maintaining the voltage across load A constant in value for varying load conditions.

The filament 14 of fuse I is preferably a two ampere fuse, and is connected between both the primary power source B and the secondary power source E and load A. If the current load presented by load A exceeds two amperes, the fuse will blow whereby the integral pin 15 will electrically engage contact 17 providing current flow from the power supply, whether it be the primary source B or the secondary source E, to energize lamp 134 and develop a voltage across resistor 138. The voltage developed across resistor 138 will be sufficient in magnitude that the voltage appearing on base 140 of transistor 142 will be positive with respect to that on emitter 144, whereby the transistor will become forward biased and conductive. Thus, current will flow from the power source through resistors 150, 148 and thence through the collector to emitter circuit of transistor 142. A voltage will be developed across resistor 150 whereby the voltage on emitter 156 will be positive with respect to that on base 152 so that the transistor becomes forward biased and conductive. Current will then flow through the emitter to collector circuit of transistor 154 to energize buzzer 160. Buzzer 160 will be maintained energized to provide an audible alarm until fuse I is repaired or replaced so that fuse pin 15 returns to its normal condition, as shown in the drawing.

To test secondary power source E, an operator will open normally closed switch S1 and close normally open switch S2. This simulates de-energization of relay coil CR1–C. The pull-in voltage of D.C. relay coil CR1–C when switch S2 is closed, is on the order of 14 volts and the drop out voltage when switch S2 is open and switch S1 is closed, is on the order of 16 volts. Thus, relay CR1 operates as a differential relay to supervise battery voltage and: (1) drop out when the battery voltage decreases below 16 volts; and (2) pull-in when the battery voltage increases to 14 volts when switch S2 is closed, placing the battery on high rate charge.

In accordance with a preferred embodiment of the invention, the values and types of various components illustrated in the single drawing are found in Table I.

TABLE I

| Component: | Component value or type |
|---|---|
| Relay CR1 | 3PDT–15VDC Coil. |
| Switch S2 | 3-position lever. |
| Battery C | 10 cell lead acid. |
| Diode 10, 12, 122 | A40F G.E. |
| Diode 128, 18, 78 | 4ZXL–6.2 G.E. |
| Resistor 130 | 100 ohms. |
| Resistor 16 | 10,000 ohms. |
| Capacitor 20 | .33 Mylar 100 v. |
| Transistor 31 | 2N2646. |
| Resistor 34 | 4700 ohms. |
| Resistor 32 | 1,000 ohms variable. |
| Resistor 36 | 3,900 ohms. |
| Resistor 46 | 2 ohms variable. |
| Silicon control rectifier 42 | C20F G.E. |
| Fuse and indicator lamp I | Buss HKA–2A–24 v. |
| Resistor 150, 138 | 270 ohms. |
| Resistor 148 | 1,000 ohms. |
| Transistor 142 | 2NI302. |
| Transistor 154 | 2NI415. |
| Buzzer | 16–24 v. D.C. |
| Meter 162 | 0–50 v. D.C. |
| Full wave rectifier 62 | Full wave selenium. |
| Capacitor 72 | 4000 mfd./50 v. |
| Capacitor 74 | 20/50 volts. |
| Resistor 76 | 5000 ohms. |
| Resistor 80 | 2,500 ohms. |
| Transistor 100, 84 | 2NI415. |
| Transistor 108 | 2NI501. |
| Resistor 94 | 100 ohms. |
| Resistor 90 | 100 ohms variable. |
| Resistor 96 | 500 ohms. |
| Resistor 116 | 350 ohms. |
| Transformer 56 | 115/24 v. @ 50 va. |

Although the invention has been shown in connection with a preferred embodiment, it will be readily apparent to those skilled in the art that various changes in form and arrangement of parts may be made to suit requirements without departing from the spirit and scope of the invention as defined by the appended claims.

I claim:

1. A direct current power supply for a direct current load comprising:

a primary source normally connected to said load for supplying direct current thereto, and including a battery for supplying the direct current and an automatic battery charger for maintaining said battery output voltage above a predetermined value;

a secondary source normally disconnected from said load and including an alternating current voltage to direct current voltage inverter adapted to be connected across an alternating current voltage source when said battery output voltage falls below a predetermined value, and a voltage regulator for regulating the inverter output voltage; and, a power supply source control circuit including means for responding to a predetermined value of said battery's output voltage to disconnect said primary source from said load and connect said secondary source to said load.

2. A direct current power supply as set forth in claim 1, wherein said means for responding includes a relay having a normally energized direct current relay coil connected in parallel with said battery, normally closed relay contacts of said relay coil connecting said primary source with said load and normally open relay contacts of said relay coil, which when closed, connecting said secondary source with said load, said relay coil being de-energized when said battery output voltage falls below a predetermined value so that said normally open contacts become closed and said normally closed contacts become open.

3. A power supply as set forth in claim 2, wherein said direct current relay coil is connected in series with a Zener diode together in parallel with said battery to provide a reference voltage for said relay coil.

4. A power supply as set forth in claim 2, in combination with a current limiting fuse circuit coupling said power supply with said load and a fuse failure alarm circuit, said fuse failure alarm circuit including means for indicating an alarm when the current to the load is above a predetermined value, a current limiting fuse filament and switching means responsive to failure of said fuse to couple said power supply to said alarm circuit, said switching means providing energization of said alarm indicating means.

5. A power supply as set forth in claim 4, wherein said fuse circuit also includes a lamp adapted to be connected across said power supply by said switching means when said fuse filament fails, said lamp presenting a visual indication of fuse failure.

6. A power supply as set forth in claim 2, wherein said battery charger includes a normally de-energized unijunction transistor relaxation oscillator, a pulse transformer connected between said oscillator and a source of alternating current voltage through said normally closed relay contacts of said relay coil, a normally nonconductive silicon controlled rectifier having a gate to cathode circuit connected to said pulse transformer and an anode to cathode circuit connected between said battery and said source of alternating current voltage through said normally closed relay contacts of said relay coil, and means responsive to a predetermined fraction of the battery output voltage to energize said oscillator and thereby cause said rectifier to become conductive and charge said battery.

References Cited

UNITED STATES PATENTS 2,747,108   5/1956   Pelavin _____ 307—66

ROBERT K. SCHAEFER, *Primary Examiner.*

H. J. HOHAUSER, *Assistant Examiner.*